Figure 1A:
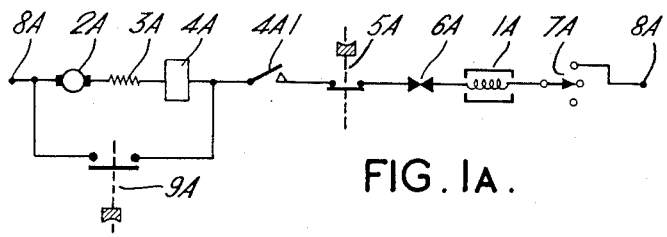

June 9, 1964   R. J. TREADWELL   3,136,923
ELECTRIC SWITCHING CIRCUITS
Filed Jan. 9, 1961   4 Sheets-Sheet 1

INVENTOR:
R. J. TREADWELL
BY: Moore of Hall
ATTORNEYS.

June 9, 1964 R. J. TREADWELL 3,136,923
ELECTRIC SWITCHING CIRCUITS
Filed Jan. 9, 1961 4 Sheets-Sheet 2

INVENTOR:
R. J. TREADWELL
BY: Moore & Hall
ATTORNEYS.

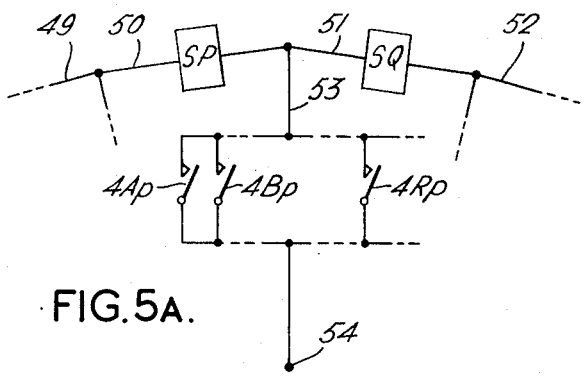
FIG.5A.
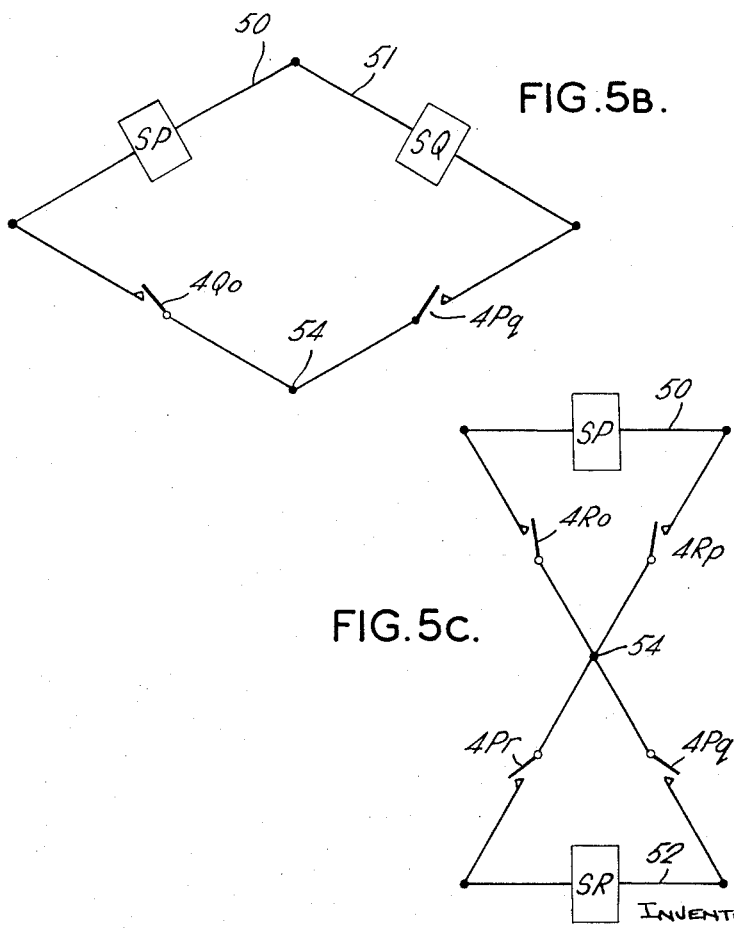
FIG.5B.
FIG.5C.
INVENTOR:
R. J. TREADWELL
BY: Moore of Hall
ATTORNEYS United States Patent Office 3,136,923
Patented June 9, 1964

3,136,923
ELECTRIC SWITCHING CIRCUITS
Richard Julian Treadwell, Farthings, Gretton, Cheltenham, England, assignor, by mesne assignments, to S. Smith & Sons (England) Limited, London, England, a corporation of England
Filed Jan. 9, 1961, Ser. No. 81,529
Claims priority, application Great Britain Jan. 29, 1960
11 Claims. (Cl. 317—29)

The present invention relates to electric switching circuits and is concerned in particular with protective electric switching circuits for electrical apparatus having three or more substantially identical electrically actuated devices, the operational requirements for the apparatus being such that any device in which a fault arises or with which a fault is associated, shall be rendered inoperative and that, should the number of operative devices be reduced to two, both devices will be rendered inoperative if a further fault arises in or is associated with either of the two devices concerned.

According to the present invention, an electric switching circuit includes a main network in the form of a single closed loop having $n$ arms (where $n$ is an integer greater than 2), each arm having connected in it a series combination including (not necessarily in the order given) a voltage source, a current operated relay, a normally open contact of that relay, a current actuated device and a normally closed contact of a cut out device which is associated with the current actuated device and is arranged to operate to open the contact under conditions requiring the current actuated device to be rendered inoperative, the series combinations each having like voltage sources and being connected in the respective arms of the network so that the polarity or phase (depending on whether the sources are direct current or alternating current respectively) of the voltage sources is in the same sense around the network, and the circuit also including a star network which is associated with the main network and has $n$ arms each joining a common connection point to a corresponding one of the junctions of the arms of the loop network and each including a normally open contact of each of the relays which are included in the series combinations connected in those arms of the loop network which are not connected directly to the same junction of the loop as the arm of the star network concerned, the $(n-2)$ contacts in each arm being connected in parallel with one another.

Alternatively, the associated star network may be replaced by an equivalent mesh network. For example, in the case where $n$ is equal to three, each arm of the star network will only have one contact in it, this being a contact of the relay connected in the arm of the mesh loop network opposite to the junction to which the arm of the star is connected, and this star network may be replaced by a single loop mesh having three arms, each of which has two contacts connected in it in series, each arm of the associated loop network including contacts of the relays in the two arms of the main loop network with which it is not connected in parallel. Where $n$ is greater than three an exact equivalent is not available, but approximations may be made.

In addition, the main loop network may itself be replaced by a main star network having $n$ arms, each arm having connected in it a parallel combination comprising a current source, a voltage operated relay, a contact of that relay which is open when the relay is operated, a current actuated device, and a normally open contact of a cut out device which is associated with the current actuated device and is arranged to close the contact under conditions requiring the current actuated devices to be rendered inoperative, the parallel combination each having like current sources and being connected so that like poles of the sources are connected to the common connection point of the star network and the associated star network being replaced by an associated loop network having $n$ arms connecting the apices of the main star network, each arm of the associated loop network having connected in it in series a normally open contact of the relays which are connected in those arms of the main star network which are not connected directly to the ends of the arm of the loop concerned.

Again, in this case, the associated loop network may be replaced by the equivalent star network. For example, in the case where $n$ is equal to three, the loop network will consist simply of three arms each containing a single relay contact, this being a contact of the relay in that arm of the star which is not connected directly to either end of the arm of the loop concerned, and this may be replaced by a star network having three arms, each containing two relay contacts connected in parallel, those being contacts of the relays connected in those arms of the main star network which do not correspond to the arm of the associated star network concerned. Again, where $n$ is greater than three an exact equivalent will not be available.

In every case, the series or parallel combinations preferably include an actuation circuit arranged so that the relay can be energized by temporarily connecting it across the voltage or current source. In a series combination, this may include a connection across the voltage source and the relay which connection includes the normally open contacts of an actuation switch, for example, a push button. In a parallel combination, the normally closed contacts of an actuation switch may be connected in series with the said normally closed contact of the relay.

Reference is made to U.S. Patent No. 2,686,285 to F. W. Meredith and Roger Milsom of which the present invention is an improvement.

Figure 1B:
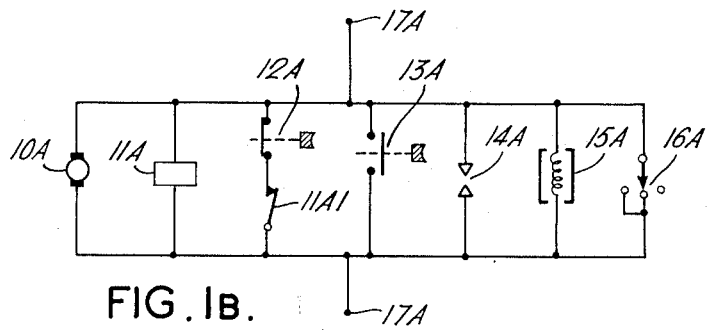
Figure 2A:
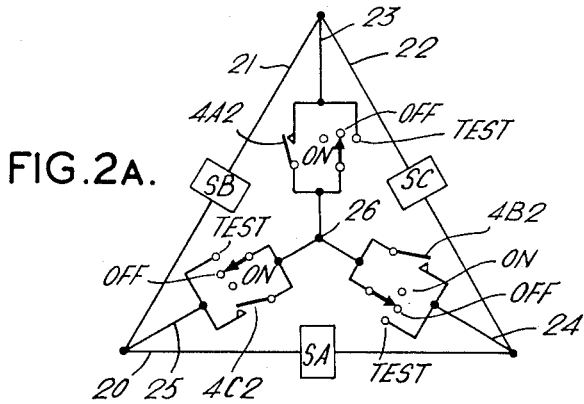
Figure 2B:
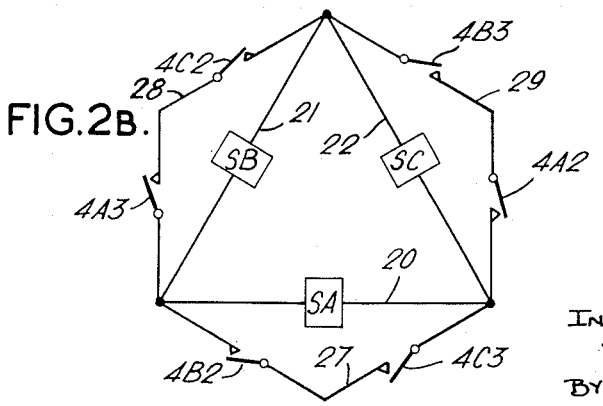
Figure 3A:
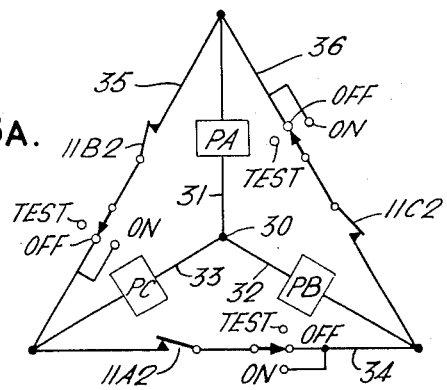
Figure 3B:
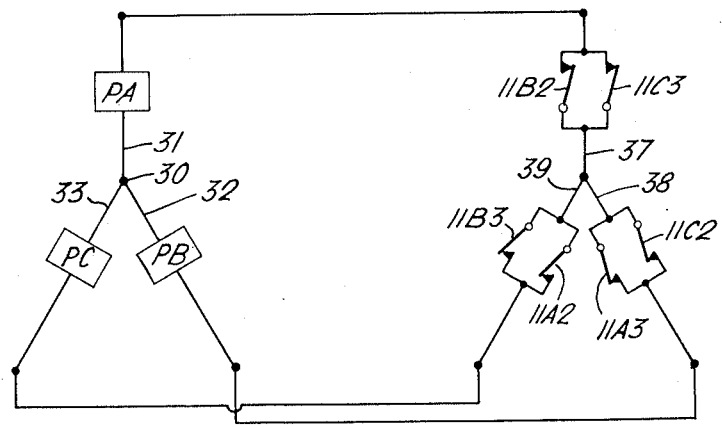
Figure 4:
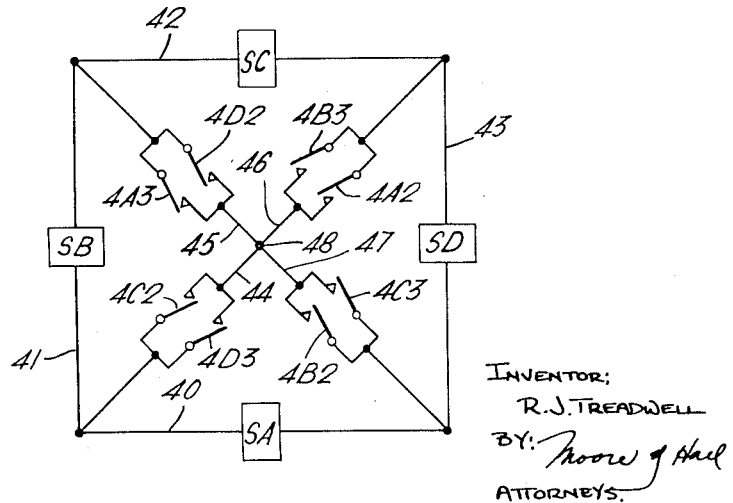
Figure 6A:
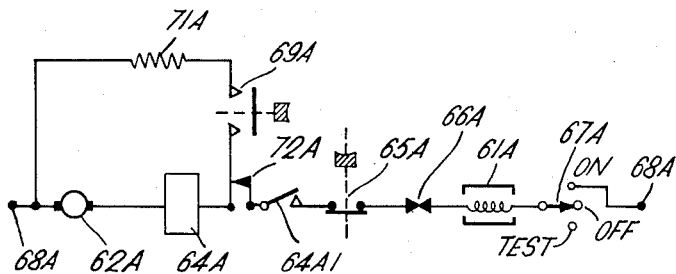
Figure 6B:
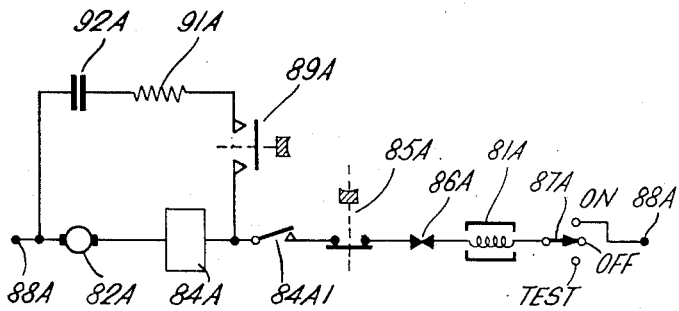

A number of embodiments of the present invention will now be described by way of example with reference to the accompanying drawings in which:

FIGURE 1A shows the circuit of a simple series combination for use in one arm of a main network which is a loop network, FIGURE 1B shows the circuit of a simple parallel combination for use in one arm of a main network which is a star network, FIGURE 2A shows a switching circuit according to the invention in which $n$ is equal to 3, the main network being in the form of a loop and the associated network in the form of a star, FIG. 2B shows the circuit of FIGURE 2A modified by replacing the associated star network by an equivalent mesh network, FIGURE 3A shows the circuit of FIGURE 2A modified by replacing the main loop network by an equivalent star network, FIGURE 3B shows the circuit of FIGURE 3A modified by replacing the associated loop network by an equivalent star network, FIGURE 4 shows a switching circuit according to the invention in which $n$ is equal to 4, the main network being in the form of a loop, FIGURE 5A shows a part of the circuit of a network according to the invention in the general case in which there are $n$ arms in the main network which is in the form of a loop, FIGURES 5B and 5C are explanatory diagrams illustrating the operation of the circuit of FIGURE 5A, and FIGURES 6A and 6B show circuits of alternative series combinations which may be used instead of that shown in FIGURE 1A.

The embodiments to be described with reference to the drawings have been designed for a particular application, namely for protective circuits for use in an automatic pilot for an aircraft. The automatic pilot has three channels, i.e. aileron, elevator and rudder channels and each channel has three or more identical sub-channels, each sub-channel of a main channel being fed with signals representing a common demand quantity from nominally identical sources and having a servomotor which is arranged to be coupled by an electro-magnetically operated clutch to the mechanical linkage(s) for operating the appropriate aircraft control surface(s). A torque switch is associated with each clutch, each torque switch being arranged to limit the magnitude of the torque applied through the clutch to the mechanical linkage to be less than a predetermined value and to operate an electric switch on any occasion that it operates so as to limit the torque. These torque switches will operate for example, if, due to a fault in one of the sub-channels, one of the servomotors of a channel is endeavouring to actuate the associated aircraft control surface differently to the remaining servomotors of that channel. Other protective devices may also be provided in each sub-channel, each being arranged in known manner to operate an electric switch if a potentially dangerous fault arises in the sub-channel concerned. For example, there may be a relay which operates on failure of a power supply, on failure of the output of a servo amplifier, on decrease in the current flowing in the reference phase of a two-phase A.C. induction motor employed as a servo motor, or on the occurrence of other significant fault conditions. It is required of the system that the clutch of any sub-channel shall be disengaged if the torque switch of that sub-channel is operated or if any of the other protective devices associated with that sub-channel are operated. So long as there are more than two clutches engaged, it is required that only the clutch of the faulty sub-channel shall be disengaged but if only two clutches remain engaged, it is required that both of them shall be disengaged if a fault then arises in either of the sub-channels concerned.

FIGURE 1A shows the circuit of a simple series combination which may be used as the energization circuit for the clutch of a sub-channel, this series combination being designed to form one arm of a switching circuit according to the present invention in which the main network is a loop. Referring now to FIGURE 1A, the circuit being that for the clutch 1A (represented only diagrammatically) of sub-channel A of a series of sub-channels A, B, C . . . of one of the channels of the auto-pilot, it will be seen that the series combination consists of a direct current voltage source 2A, a resistor 3A (this is to be understood to include the internal resistance of the source 2A) the operating coil of a relay 4A, a normally open contact 4A1 of the relay 4A, the normally closed contacts of a cut-out switch 5A, the normally closed contacts of the torque switch 6A associated with the clutch 1A and one pole 7A of a three position sub-channel on/off/test switch which completes the series circuit between the terminals 8A (assuming the other contacts to be closed) only when the switch is in the "on" condition. In addition there is a sub-channel energizing switch represented by the "on" button 9A which when depressed completes a connection across the voltage source 2A, the resistor 3A and the operating coil of the relay 4A, thus providing a circuit for energizing the relay 4A. When this is done the contact 4A1 will close and the operating coil of the clutch 1A will then be energized on release of the "on" button provided that the contacts of the cut-out switch 5A and of the torque switch 6A are both closed and the channel switch is "on." It will be appreciated that it is only a simple basic circuit which has been described above and that the cut-out switch 5A or the contacts 6A of the torque switch may be supplemented by other normally closed contacts associated with other protective devices as required in any particular case, these latter contacts opening on the occurrence of certain fault conditions. It will also be appreciated that the order in which the various elements are connected in the circuit is not important except insofar as it is necessary to be able to energize the relay 4A by means of a push button or some other form of switch which completes a circuit across the coil of the relay 4A and the voltage source 2A, without energizing the coil of the clutch 1A.

FIGURE 1B shows the circuit of a basic parallel combination which may be used in a case in which the main network is a star network, the combination being the parallel equivalent of the series combination shown in FIGURE 1A. Describing this combination briefly, it comprises a direct current source 10A which is connected in parallel with the operating coil of a voltage operated D.C. relay 11A, the normally closed contacts of an "on" button 12A in series with normally closed contact 11A1 of the relay 11A, the normally open contacts of a cut-out switch 13A, the normally open contacts of a torque switch 14A, the operating coil of the sub-channel clutch 15A and the contacts of one pole 16A of a three position sub-channel on/off/test switch, which contacts are closed in two positions, namely the "off" and "test" positions but are open in the "on" position. This parallel combination is connected between terminals 17A.

FIGURE 2A shows a switching circuit according to the present invention in the case in which $n$ is equal to three. The main network in this case is a loop network having three arms 20–22 in each of which is connected respectively a series combination SA, SB or SC, as shown in FIGURE 1 and represented here simply by a block, of one of the three sub-channels A–C of the channel for which this circuit is provided. The three combinations SA, SB and SC are connected in the respective arms 20–22 of the network so that the polarities of the voltage sources 2A–C are all in the same sense around the loop that is to say are connected in series aiding relationship with one another. Associated with this main network is a star network having three arms 23–25 connecting a common connection point 26 to each of the junctions of the arms 20–22 of the main network. (The elements of combination SB and SC will be given the same reference as those of combination SA but with the affix B or C instead of A.) The circuit of arm 23 of the star network comprises a normally open contact 4A2 of the relay 4A in the series combination SA which contact 4A2 is connected in parallel with the contacts of a further pole of the on/off/test switch or sub-channel A, the contacts of this pole being arranged to close the circuit in parallel with contact 4A2 only when the switch is in the "Test" condition. The circuits of the other two arms 24 and 25 of the star network are greatly similar except that they contain contacts 4B2 and 4C2 of the relays 4B and 4C respectively in parallel with further poles of the on/off/test switches of sub-channels B and C. It will be noted that the arm 23 of the star opposite to the arm 20 of the loop contains the contact 4A2 of the relay 4A in the arm 20 and that there is a similar correspondence in the case of the other arms.

Turning now to the operation of the circuit shown in FIGURE 2A, it will be seen that if all the sub-channel switches are in the "on" position, and the relays 4A, 4B and 4C are all energized, so that the contacts 4A1, 4B1 are all closed, the operating coils of the three clutches 1A–C will all be energized provided that operation is normal and the cut-out and torque switches remain in their normal condition with their contacts closed Should a fault occur in any one of the sub-channels A–C, for example the sub-channel A, the contacts of the torque switch 6A and/or the out-out switch 5A will open according to the nature of the fault, thus de-energizing the coil of the clutch 1A and also the coil of the relay 4A. On de-energization of the relay 4A, the contacts 4A1 and 4A2 will revert to their normal open condition, the former breaking further the energization circuit for the coils of the relay 4A and the clutch 1A, so that, if the contacts of the torque switch 6A or of the cut-out switch 5A are restored to their closed condition with the fault still present, the clutch and relay will remain de-energized. The contact 4A2, on opening, will make the arm 23 an open circuit, provided that the sub-channel A switch remains in the "on" or "off" condition. When this has occurred, the sub-channel A will have been rendered inoperative but sub-channels B and C will remain operative since the coils of the clutches 1B and 1C will remain energized as there is a closed loop circuit formed by the arms 21 and 22 of the loop network and the arms 24 and 25 of the star network. However, should a subsequent fault result in breakage of the circuit of either of series combination SB and SC, no circuit will remain for energization of the clutch coil of the other combination and both the remaining channels will be rendered inoperative together. It will thus be seen that the switching circuit of FIGURE 2A fulfills the operational requirement that as long as there are more than two clutches operative, a fault associated with any one of them will result in that one being rendered inoperative but, if there are only two clutches operative, a fault associated with either of them will render both of them inoperative.

The purpose of the three position sub-channel switches is as follows. In the "off" position the sub-channel clutch coil cannot be energized and the sub-channel remains inactive. If all three sub-channel switches are "on," all three clutch coils can be energized, assuming normal conditions, and the action of the circuit of FIGURE 2A proceeds as described above, the sub-channel switches having no effect on this circuit in either the "on" or the "off" condition. If it is desired for any reason to put any two sub-channels out of action, their switches are put to the "test" position. This prevents the clutch coils of those sub-channels being energized but at the same time causes a short circuit in the corresponding arms of the star network. As a result the remaining sub-channel, if its switch is "on," can operate alone and the circuit of FIGURE 2A is modified by the sub-channel switches to complete an operating circuit for the series combination of that sub-channel which otherwise would not be available. This facility may be required for testing the system one sub-channel at a time, or in an emergency where it is desired to operate with a single sub-channel.

It is further preferable to provide in each arm of the star network of FIGURE 2A a sensitive current detector connected between the common point 26 and the switch and relay contacts in the arm concerned. In practice small unbalance currents will flow in the arms of the star network, and the presence of these currents is thus indicative of closure of the contacts 4A2, 4B2 and 4C2. Once all three sub-channels are "on," the star network is redundant and any one of these contacts could open without affecting the operation, so long as all three sub-channels are "on." If, however, subsequently one sub-channel becomes disengaged due to a fault, this other fault could in some cases lead to all three sub-channels becoming dis-engaged immediately, instead of two remaining in action. This is undesirable and the current detectors are provided to give an indication of the occurrence of such a fault in the star network.

FIGURE 2B shows an alternative circuit in which the associated star network of the circuit shown in FIGURE 2A has been replaced by an equivalent mesh. In this case the equivalent mesh is a loop network having three arms 27–29 connected in parallel with the three arms 20–22 of the main network. The arms 27–29 correspond to the arms 23–25 respectively of the star network of FIGURE 2A, arm 27 containing normally open contacts 4B2 and 4C3 of the relays 4B and 4C in the series combinations SC and SB connected in series, and so on as shown in FIGURE 2B. Here again, it will be seen that if the circuit of any one of the series combinations SA–SC is broken on the occurrence of a fault in the sub-channel concerned, the clutch coils of the remaining two combinations will remain energized. If, however, the circuit of a further series combination is broken, the clutch coils of both the series combination still operative will be de-energized rendering both the remaining sub-channels inoperative.

FIGURE 3A shows the circuit of the case in which $n$ is equal to three and the main network is a star network. In all cases in which the main network is a start network, parallel combinations such as that shown in FIGURE 1B are connected in all the arms and these are represented in FIGURE 3B simply by the blocks PA–PC. (The elements of combinations PB and PC will be given the same references as those of combination PA but with the appropriate affix B or C.) It is necessary, however, that the polarities of the current sources 10A–C shall be arranged so that the common point 30 of the star network is connected to poles of like kind in all three parallel combinations. Associated with this main star network is a loop network having three arms 34–36 which interconnect the apices of the main star network. The arm 34 of the loop network contains a normally closed contact 11A2 of the relay 11A of parallel combination PA connected in series with the contacts of one pole of the sub-channel A switch, these contacts being arranged so that they are closed when the sub-channel A switch is in the "on" or the "off" position but are open if it is in the "test" position. The arms 35 and 36 are exactly similar except that they contain contacts 11B2 and 11C2 respectively of the relays 11B and 11C of the parallel combinations PB and PC in series with further poles of sub-channel switches of sub-channels B and C respectively.

The operation of the circuit shown in FIGURE 3A is very similar to that of the circuit shown in FIGURE 2A. Assuming that the "on" buttons 12A–C have been operated, and that the cut out and torque switches all remain in their normal conditions with their contacts open, the relays 11A–C and the coils of the clutches 15A–C will be energized (it is here assumed that the sub-channel switches are in their "on" conditions). With these conditions applying, the contacts 11A2, 11B2, 11C2, which are all normally closed, will be open as the relays 11A–C are energized. Thus, all the arms 34–36 of the loop network will be an open circuit. If a fault arises in one of the sub-channels, say for example sub-channel A, the contacts of the cut out swtich 13A and/or the torque switch 14A will close, depending on the nature of the fault. This will present a short circuit across the current source 10A which in its turn will de-energize the relay 11A and the coil of the clutch 15A. De-energization of the coil 11A will allow contacts 11A1 to close, thus preventing re-energization of relay 11A should the contacts of the cut out switch 12A or torque switch 14A reopen for any reason. As a result, the arm 31 of the star network becomes a short circuit. In addition, de-energization of the relay 11A will allow the contacts 11A2 to close, thus making the arm 34 a short circuit. The arms 35 and 36 remain open circuits, however, and therefore, there is no short circuit connected directly across either of the arms 32 or 33 of the star network, which contain the parallel combinations PB and PC. The sub-channels B and C, therefore, remain in operation as is required. If subsequently a fault arises in either of the sub-channels B or C, a similar sequence of events, assuming it is sub-channel B, will result in arm 32 of the star network and arm 35 of the loop network becoming short circuits. This having occurred, there are short circuits connected directly across the arm 33 of the star network which will result in de-energization of the relay 11C and the coil of the clutch 15C. As required, therefore, both the sub-channels which still remained operative, are rendered in-operative by de-energization of their clutch coils.

FIGURE 3B shows the circuit of FIGURE 3A modified by replacing the associated loop network by an equivalent star network which has arms 37–39 corresponding respectively to the arms 34–36 of the loop network of FIGURE 3A. The arm 37 contains normally closed contacts 11B2 and 11C3 of the relays 11B and 11C connected in parallel, the other two arms 38 and 39 being correspondingly constituted. The operaiton of this circuit is similar to that of the circuit of FIGURE 3A and it will be seen that if any one of the parallel combinations PA–PC becomes a short circuit, the remaining two can continue to operate normally, but that if either of the remaining two parallel combinations becomes a short circuit, both of them are rendered inoperative.

FIGURE 4 shows the circuit of a case in which $n$ is equal to 4, the main network is a loop network having four arms 40–43 and the associated network is a star network having four arms 44–47 joining a common connection point 48 to the junctions of the arms 40–43 of the main network. The arms 40–43 each contain a series combination SA–SD respectively, these being connected again so that the polarities of the voltage sources 2A–D are in the same sense around the network. Each of the arms 44–47 contains two normally open relay contacts in parallel, the contacts in the arm 44 being contacts 4C2 and 4D3, these being contacts of the relays 4C and 4D which are included in the series combinations SC and SD of the arms 42 and 43 which are not connected directly to the same junction of the loop network as is the arm 44 of the star network. It will be seen that the other arms 45–47 are similarly constituted by applying this general principle of including contacts of those relays which are connected in the arms not directly connected to the junction to which the arm of the star network concerned, is connected.

The operation of the circuit shown in FIGURE 4 is similar to that of the circuit shown in FIGURE 2A. If a fault arises in one sub-channel, say for example sub-channel A, the arm 40 of the main network will become an open circuit and the contacts 4A2 and 4A3 will open. This will not affect the condition of the arms 46 and 45 of the star network in which they are connected, as the contacts 4B3 and 4D2 respectively of those arms will remain closed. If a fault then arises in a second sub-channel, for example sub-channel B, the arm 41 will become an open circuit and the contacts 4B3 and 4B2 in the arms 46 and 47 of the star network will open. This will result in the arm 46 becoming an open circuit, as the contact 4A2 is already open, but the arms 44, 45 and 47 will remain unaffected as they still contain at least one closed contact. In consequence, there is still a circuit available for energization of the relays 4C–D and the coils of clutches 1C–D in the series combinations SC and SD, the circuit being formed by the loop consisting of the arms 42 and 43 of the main network and the arms 47 and 45 of the star network. However, if a fault arises in a further sub-channel, say sub-channel C, sub-channel D will be rendered inoperative at the same time as there will be no circuit available across the arm 43 to enable the coil of the clutch 1D to remain energized. It will be seen that a sequence of events, differing only in detail from that outlined above, will occur if the first two sub-channels in which faults arise, are in opposite (as opposed to adjacent) arms of the loop network.

FIGURE 5A shows a part of the circuit for the general case in which $n$ is an integer greater than 4. Two arms 50–51 of the main loop network are shown, these including series combinations SP and SQ. Parts of the adjacent arms 49 and 52 of the loop are also shown. Only one arm of the associated star network is shown, that being the arm 53 joining the junction of arms 50 and 51 to the common connection point 54 of the star network. This arm 53 contains a mesh of relay contacts connected in parallel, these contacts being one from each of the relays included in the series combinations connected in every arm except the arms 50 and 51 to the junction of which the arm 53 is connected. Only some of these contacts which are all normally open contacts or the relays concerned, are shown in FIGURE 5A, namely contacts 4A$p$, 4B$p$ and 4R$p$ and it will be appreciated that there are in all $(n-2)$ contacts where $n$ is the number of arms of the main network. The operation of this general circuit is similar to that of the circuits described with reference to FIGURES 2A and 4. If there is a fault in any sub-channel, the coil of the clutch in that channel becomes de-energized. If faults arise subsequently in other sub-channels, this will continue until the number of sub-channels remaining operative is reduced to two. When this has occurred, the circuit shown in FIGURE 5A will have reduced to one of the circuits shown in FIGURES 5B and 5C, depending on whether the two sub-channels remaining correspond to adjacent or separate arms respectively of the loop network. In the first case, the circuit will have reduced effectively to that shown in FIGURE 5B, the relay contacts 4P$q$ and 4Q$o$ being closed, this being the condition in which they will have remained since the time when the relays 4P and 4Q were energized at the commencement of operation. There is thus a circuit available to maintain the coils of clutches 1P and 1Q energized. If, however, a fault now arises in either of sub-channels P or Q, this circuit will be broken and both the sub-channels will be rendered inoperative. Similarly, in the second case, the circuit of FIGURE 5A will reduce effectively to that shown in FIGURE 5C. Here again the contacts 4P$q$, 4P$r$, 4R$p$ and 4P$o$ will all be closed, that being the condition they will have taken up on energization of the relays 4P and 4R at the commencement of operation. There are those circuits available to maintain the coils of both the clutches 1P and 1R energized. Should a fault now arise in either of sub-channels P and R, the cut out switch or the torque switch of the channel concerned will render that channel inoperative and the contacts of the relay of that sub-channel will open, breaking the circuit by which the clutch coil of the other sub-channel has been held energized. Both sub-channels will therefore be rendered inoperative.

It will be appreciated that the form of the series and parallel combinations used in circuits according to the invention is not restricted to that of the combinations described with reference to FIGURES 1A and 1B and that other forms of such combinations may be used as may be necessary or convenient. The circuits of two alternative forms of series combination are shown in FIGURES 6A and B.

In the combination shown in FIGURE 6A, the elements are identical with those of the combination shown in FIGURE 1A with the exceptions that there is no load resistor connected in series with the voltage source of 62A and that the energization circuit for the relay 64A is somewhat different. Thus, the contacts associated with the "on" button 69A are connected in series with a resistor 71A which has the same impedance as the coil of the clutch 61A, across the voltage source 62A and the coil of the relay 64A. The contacts associated with the button 69A are normally open and include a make-before-break contact 72A arranged so that, on full depression of the button 69A, only the coil of relay 64A is energized, energization of the coil of the clutch 61A following when the contact 72A closes on release of the button 69A.

The combination shown in FIGURE 6B is again similar, the difference again residing in the arrangement provided to prevent energization of the coil of the clutch 81A before the "on" button 89A has been released. Here, the contacts associated with the button 89A are ordinary normally open contacts and these are connected in series with a resistor 91A and a capacitor 92A across the voltage source 82A and the coil of the relay 84A. The magnitude of the resistor 91A is equal to the resistance of the coil of the clutch 81A and the magnitude of the capacitor 92A is determined so that it is approximately equal to the value obtained by dividing the inductance of the coil of the clutch 81A by the square of the resistance of the resistor 91A. In this case, on pressing the "on" button, the initial charging current of the capacitor 92A energizes the relay 84A until the current drawn by the coil of the clutch 81A has built up sufficiently to hold relay 84A in.

In yet another case the coil of a further relay may be connected in series with the "on" button 9A together with a circuit comprising a resistor and capacitor in parallel. The further relay has a normally open contact connected in parallel with the contact 4A1 of the relay 4A. This further relay is energized on closing the contacts of the "on" button 9A but remains energized for only a short time as determined by the time constant of the CR network in series with it. While operated, it provides a circuit in parallel with contact 4A1 for the operating current for the coil of the clutch 1A. This is necessary as this latter current builds up only slowly and may not reach a value sufficient to hold in the relay 4A before the button 9A is released.

Whilst the particular switching circuits, according to the invention described with reference to the drawings are described for the specific purpose of controlling the energization of the electro-magnetic clutches forming part of automatic pilots, it will be appreciated that the circuits may also be used in other electrical apparatus where protective switching of the kind provided by circuits according to the present invention is required in the energization circuits of three or more like electrically actuated devices.

The particular circuits described have all been D.C. circuits but it will be appreciated that the equivalent A.C. circuits may be used provided that the current or voltage sources, as the case may be, are synchronous and are connected in the case of a loop network with their phases in the same sense around the loop that is to say are connected in series aiding relationship with one another and in the case of a star network with like phases connected to the common connection point.

The particular form of the voltage and current sources in either case may be selected as required to meet a given set of operating conditions. In the case of D.C. current sources, a bridge rectifier fed from an A.C. source through a transformer having a core of "square-loop" material via a capacitor has been found suitable, its characteristic being such that the increase of current on short-circuiting it is comparatively limited.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

I claim:

1. An electric switching circuit comprising a main network in the form of a single closed loop having $n$ arms, where $n$ is an integer greater than 2, each arm having connected in it a series combination comprising not necessarily in the order given, a voltage source, a current operated relay, a normally open contact of that relay, a current actuated device and a normally closed contact of a cutout device which is associated with the current actuated device and is arranged to operate to open the contact under conditions requiring the current actuated device to be rendered inoperative, the series combinations having like voltage sources and being connected in the respective arms of the network so that in passing around the network the polarities or phases depending on whether the sources are direct current or alternating current respectively, of the voltage sources are in series aiding relationship with one another, and the circuit also comprising a star network which is associated with the main network and has $n$ arms each joining a common connection point to a corresponding one of the junctions of the arms of the loop network and each comprising a normally open contact of each of the relays which are included in the series combinations connected in those arms of the loop network which are not connected directly to the same junction of the loop as the arm of the star network concerned, the $(n-2)$ contacts in each arm being connected in parallel with one another.

2. An electric switching circuit according to claim 1 in which $n$ is equal to three and the associated star network is replaced by an equivalent mesh network which is a single loop mesh network having three arms, each comprising two contacts connected in it in series, said two contacts being contacts of the relays in the two arms of thet main loop network with which the particular arm of the associated loop network is not connected in parallel.

3. An electric switching circuit according to claim 1 in which in each series combination the voltage source and the relay are connected adjacent to one another and the combination further comprises an actuation circuit having a manually operable switch for completing a temporary circuit across the voltage source and the relay.

4. An electric switching circuit comprising a main star network having $n$ arms, each arm having connected in it a parallel combination comprising a current source, a voltage operated relay, a normally closed contact of said relay which is open when said relay is energized, a current actuated device, and a cut-out device having a normally open contact associated with said current actuated device, said cut-out device being arranged to close said normally open contact under conditions requiring the current actuated device to be rendered inoperative, said parallel combinations each having like current sources and being connected so that like poles of said sources are connected to the common junction point of said star network, and an associated loop network having $n$ arms connecting the apices of said main star network, each arm of said associated loop network having connected in it in series at least one normally closed contact of the relay connected in that arm of the main star network not connected directly to the ends of the arm of the loop containing said last named closed contact.

5. An electric switching circuit according to claim 4 in which each parallel combination further comprises a manually operable switch having a normally closed contact in series with said normally closed contact of the voltage operated relay.

6. The combination set forth in claim 4, in which $n$ is equal to three, the said associated loop network comprising a second star network having three arms each containing two relay contacts connected in parallel, said two relay contacts being contacts respectively of the relays connected in those arms of the main star network the apex of which is not connected to the arm of said associated loop network containing said two relay contacts.

7. An electric switching circuit according to claim 1 in which the series combinations each further include at least one normally closed contact, which is opened on the occurrence of a condition requiring the current actuated device to be rendered inoperative.

8. An electric switching circuit according to claim 4 in which the parallel combinations each further include at least one normally open contact connected in parallel with the other elements of the combination, which contact is closed on the occurrence of a condition requiring the current actuated device to be rendered inoperative.

9. An electric switching circuit according to claim 1 in which the current actuated device of each series combination is the operating coil of an electro-magnetic clutch.

10. An electric switching circuit according to claim 4 in which the voltage actuated device of each parallel combination is the operating coil of an electro-magnetic clutch.

11. An electric switching circuit according to claim 9 in which the clutches are included in a servo system of the kind having a plurality of identical sub-channels which are fed with signals from identical sources and actuate a common output member, the clutches forming part of the coupling of respective sub-channels outputs to the common output member and the couplings further including torque responsive devices adapted to open a contact constituting said closed contact of a cut-out device if the torque transmitted by the clutch exceeds a predetermined value.

No references cited.